Patented Aug. 24, 1926.

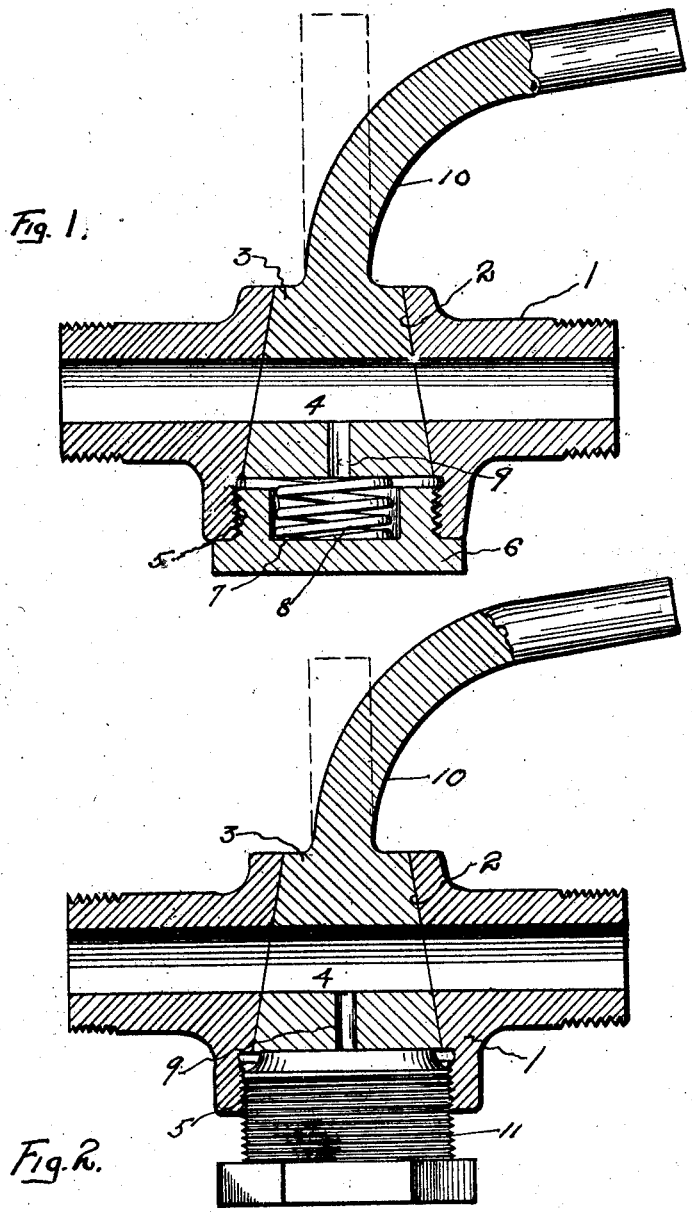

1,597,537

UNITED STATES PATENT OFFICE.

GUSTAVE M. NELL, OF CLEVELAND, OHIO, ASSIGNOR TO THE CLEVELAND ROCK DRILL COMPANY, OF CLEVELAND, OHIO.

THROTTLE VALVE FOR ROCK DRILLS.

Application filed March 18, 1925. Serial No. 16,538.

The present invention is directed to improvements in throttle valves for rock drills, and more particularly to the handles thereof.

It has been the practice heretofore to make the plug and handle of the valve separately, the handle being bolted or riveted to a square shank of the plug, which is extremely undesirable in devices of this character. It is a well known fact that rock drills of the percussive type are subjected to considerable vibration when operating, this vibration in a comparatively short time causing the usually constructed handles to become loose or accidentally detached from the plugs.

Therefore the primary object of the invention is to provide a valve of this character so constructed that the handle for operating the same will be prevented from becoming detached from the plug or loose thereon.

With these and other objects in view, this invention resides in the novel features of construction, formation, combination and arrangement of parts to be hereinafter more fully described, claimed and illustrated in the accompanying drawing, in which:—

Figure 1 is a longitudinal sectional view through the device, showing the handle in its operative position.

Figure 2 is a similar view showing the valve holding plug in its operative position.

Referring to the drawing, 1 designates a casing designed to be connected in any approved manner between the air supply hose and hammer chamber of a percussive drill. This casing has a transverse seat 2 formed therein and co-operative therewith is a valve plug 3, said seat and plug being correspondingly tapered to assure effective operation. The plug 3 has a transverse port 4 therein to control the passage of fluid through the casing, as is customary.

The casing 1 is further provided with an interiorly threaded socket 5 and with which the major end of the seat 2 coincides. After the valve plug 3 has been placed in the seat 2, a screw plug 6 is threaded into the socket 5, said plug having a recess 7 formed therein and with the base of which one end of the coil spring 8 engages, the other end thereof being engaged with the adjacent end of the valve plug 3. This spring serves to firmly hold the valve plug seated when the air pressure in the casing is reduced or totally cut off, thereby preventing accidental opening or closing of the valve.

To assure proper seating of the valve plug when the drill is running, a duct 9 is formed in the major end thereof to permit air pressure to build up in the recess 7 and exert pressure upon the plug 3 in an obvious manner.

The minor end of the plug 3 terminates in an integrally connected handle 10, which is initially disposed in axial alinement with the plug, as shown in dotted lines in Fig. 1 of the drawing.

It has been found desirable to hold the plug 3 firmly seated during the bending of the handle 10 from its initial position to its proper angular relation with respect to the plug 2 and in order to accomplish this a solid plug 11 is screwed into the socket 5, with its inner end impinged against the inner end of the plug 3, after which the bending operation is performed. After the handle 10 has been bent to the desired angle the plug 11 is removed and the plug 6 substituted.

The cross sectional area of the valve seat 2 is such that should the valve become leaky the plug can be removed and the handle 10 withdrawn through the seat to permit relapping of the plug.

From the foregoing description it will be seen that a handle for throttle valves has been provided constructed in such manner as to eliminate the use of rivets and bolts and shanks for securing the same to the valve plug, thereby simplifying constructions of this kind, as well as producing a device which is extremely simple, durable and can be manufactured at a very small cost.

What is claimed is:—

A method of applying valve plugs to valve casings, which consists in providing the casings with valve seats, providing the valve plugs with integrally connected handles, passing the handles through the seats until the plugs are firmly seated thereon, then attaching a plug to the casing for holding the valve plugs against movement while the handles are being bent in angular relation with respect to the longitudinal axes of the valve plugs.

In testimony whereof I affix my signature.

GUSTAVE M. NELL.